United States Patent [19]

Wattenhofer

[11] Patent Number: 4,486,847

[45] Date of Patent: Dec. 4, 1984

[54] WATCH PROVIDED WITH A MICROCOMPUTER

[75] Inventor: Jean P. Wattenhofer, Neuchatel, Switzerland

[73] Assignee: E.T.A., S.A. Fabriques d'Ebauches, Switzerland

[21] Appl. No.: 577,121

[22] Filed: Jan. 27, 1984

Related U.S. Application Data

[63] Continuation of Ser. No. 232,577, Feb. 9, 1981.

[30] Foreign Application Priority Data

Feb. 12, 1980 [CH] Switzerland ........................ 1127/80

[51] Int. Cl.[3] ........................ G06F 7/48; G06F 15/02

[52] U.S. Cl. .................................... 364/705; 364/706; 368/112

[58] Field of Search ............... 364/705, 706, 900, 569; 368/10, 69, 70, 73, 62, 1, 111, 112, 224, 239

[56] References Cited

U.S. PATENT DOCUMENTS

| | | | |
|---|---|---|---|
| 3,992,871 | 11/1976 | Numabe | 368/112 |
| 4,023,345 | 5/1977 | Imamura | 368/112 |
| 4,110,966 | 9/1978 | Kashio | 368/112 |
| 4,194,352 | 3/1980 | Terzian | 368/239 |

*Primary Examiner*—Gareth D. Shaw
*Assistant Examiner*—Jameson Lee
*Attorney, Agent, or Firm*—Allegretti, Newitt, Witcoff & McAndrews, Ltd.

[57] ABSTRACT

A microcomputer used in the multi-function watch comprises, in addition to its conventional circuits such as the program memory 1, the data memory 7 and the arithmetic and logic unit 6, a counter 13 with a counting capacity of 100. The counter can be set in operation and stopped by instructions forming part of a manually triggered program of the microcomputer. When it is operating, it counts pulses M1 of a frequency of 100 Hz which are supplied by the time base 10, 11 of the watch. When it reaches its maximum capacity, it is reset to zero and produces a chronographic time base signal T which sets the microcomputer in operation. This microcomputer then carries out a program which processes and causes display of the data relating to seconds, minutes and hours of chronographic time, which are stored in the data memory 7. Data relative to hundredths of a second of the chronographic time are given by the content of the counter and are processed and displayed only at the end of the operation of measuring the chronographic time.

3 Claims, 7 Drawing Figures

WATCH PROVIDED WITH A MICROCOMPUTER

This application is a continuation of application Ser. No. 232,577, filed Feb. 9, 1981.

BACKGROUND OF THE INVENTION

The present invention concerns a multi-function watch provided with a time keeping microcomputer.

U.S. Pat. No. 4,063,409 discloses a watch of this kind, wherein the microcomputer comprises a data memory in the form of a random access memory, combined with a programmable logic unit. An oscillator supplies an internal time base and controls the circuits which operate on the data in the random access memory. The clock and control circuits comprise a program memory in the form of a read only memory, which permits reading and handling in accordance with a given program of the data contained in the data memory. The programmable logic unit selects data from the data memory, increments such data, compares the data to limit values and actuates one or more gates in accordance with the desired program. Such data may be selectively displayed, for example by means of a liquid crystal display. The functional and display modes of the microcomputer may be adapted to the functions desired in a specific multi-function watch, by suitably modifying the programmable logic unit and the program memory, without altering the design lay-out of the system.

The main disadvantages of such a microcomputer watch are as follows:

a. Computation of time must be repeated at a rate which depends, in particular in the chronograph mode of operation, on the precision of the chronograph. If the precision of the chronograph is to be one tenth of a second, that represents a rate which is ten times that of normal operation, and therefore involves a very high level of consumption.

b. The time required to perform the successive operations relating to time computation is of the order of 20 milliseconds. It is therefore not possible to effect chronographic time measurement to a hundredth of a second, with the full degree of reliability desired.

BRIEF SUMMARY OF THE INVENTION

An object of the invention is to provide a watch with a microcomputer and to reduce the electrical power consumption, particularly when it is operating in the chronograph mode, and such as to permit measuring chronographic time to a hundredth of a second.

The multi-function watch according to the invention comprises means for producing a first and second real time base signal, means for manual control of the different watch functions, display means and a microcomputer programmed to produce time data in response to the first time base signal and to supply data to the display means. The microcomputer has counting means for producing a chronographic time base signal in response to the second time base signal and is programmed to start and stop the counting means in response to starting and stopping signals supplied by the manual control means to produce chronographic time data in response to the chronographic time base signal and to supply the chronographic time data to the display means.

BRIEF DESCRIPTION OF THE DRAWINGS

The invention will be described in greater detail, by way of illustration and example, with reference to the accompanying drawings, in which.

DETAILED DESCRIPTION OF THE PREFERRED EMBODIMENT

Figure 1:
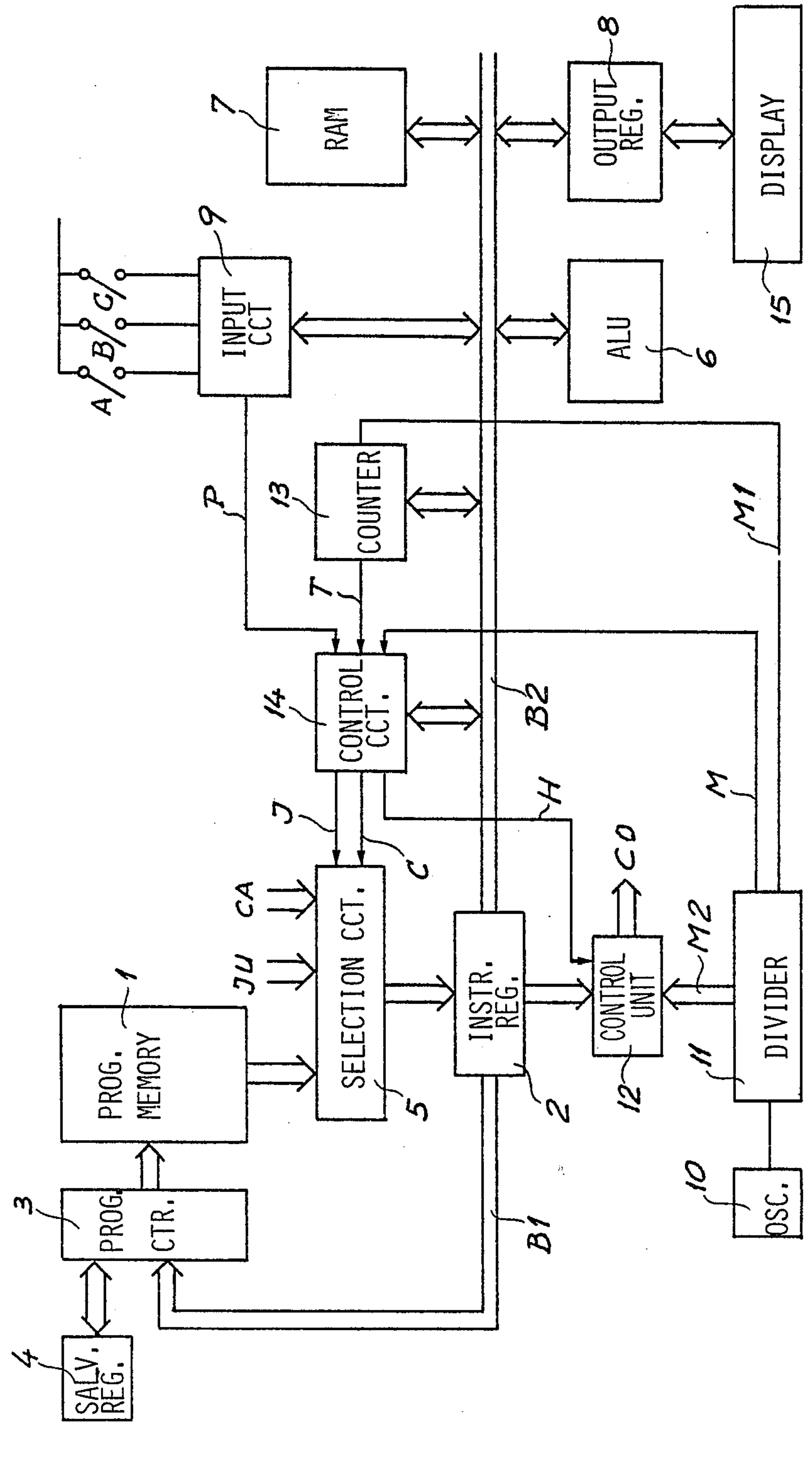
FIG. 1 is a block circuit diagram of an illustrative watch embodying the invention.

The illustrative watch embodying the invention, as shown in FIG. 1, comprises push buttons which are intended for actuation by the user of the watch for controllinq the different functions thereof such as time setting, setting to the chronograph mode, starting, stopping and resetting to zero of the chronograph, etc. Three of the pushbuttons, designated by references A, B and C, are shown in symbolic form in the drawing. The watch also comprises a display means 15 and a time base formed by an oscillator 10 and a frequency divider 11. The latter, in a preferred embodiment, produces two time base signals M and M1, at a frequency of 1 Hz and 100 Hz respectively, and signals which are generally denoted by reference M2, for synchronizing the microcomputer which will be described hereinafter.

The microcomputer of the watch comprises a program memory 1 in the form of a read only memory, and a storage register 4 which is intended, under certain conditions, to register one or more addresses. These circuits are connected together by a set of connecting means, or bus, B1.

A selection circuit 5 normally connects the output of the program memory 1 to the input of the instruction register 2. In the presence of a first control signal J which is produced only when the microcomputer is in its rest state, the selector 5 interrupts the above-mentioned connection and applies a fixed instruction JU, which is wired to its input, to the input of the register 2. The instruction JU, which is an unconditional jump instruction, causes in particular the loading into the program counter 3 of the starting address of the main program.

The selector 5 also reacts to a second control signal C, which is produced only when the microcomputer is in operation, to apply to the input of the register 2 another fixed instruction CA which is also wired to its input. The instruction CA causes the storing of certain important data, concerning the program in operation, in registers provided for that purpose, such as the register 4, and then loading into the program counter 3 of the starting address of the main program.

Other data transfers are effected by means of a second set of connecting means or bus, B2 between: an arithmetic and logic unit 6 which, in response to given instructions, performs arithmetic and logic operations on complete words or on parts thereof, such as the addition or complementation of words, or testing or setting to '0' or ,'1' of certain bits. In addition to the circuits for performing those operations, the arithmetic and logic unit comprises, in a conventional manner, an accumulator for storing the result of such operations and for transmitting such result to the bus means B2, and accessory registers such as carry-over or state registers;

registers which comprise, in particular, a data memory 7 in the form of a random access memory (RAM), and an output register 8 controlling the display means 15 of the watch; an input circuit 9, which will be described hereinafter, for producing a signal P whenever a pushbutton A, B or C is pressed.

Finally, a sequencer circuit or control unit 12 synchronizes and controls the operation of the microcomputer by dispatching to the different circuits thereof, signals which are designated generally by CO, at moments determined by the signals M2. The circuits to which the signals CO are passed, by connecting means not shown in FIG. 1, are determined by the instructions that the control unit 12 receives from the register 2. A signal H makes it possible to suppress the signals CO and therefore stop the microcomputer.

The design of the microcomputer as described hereinbefore is of a generally known type and therefore need not be described in greater detail.

The novelty in the structure of the present microcomputer lies in the use of two supplementary circuits which are also connected to the bus means B2 and which can be addressed as the different positions of the memory 7: a counter 13 which has a counting capacity of which can be set in operation, stopped and reset to zero by instructions that it receives by way of the bus means B2. When it is in operation, the counter 13 counts the pulses of the signal M1 and produces a signal T whenever it reaches its maximum capacity and is reset to zero; a control circuit 14 which will be described hereinafter, for receiving the signals P from the input circuit 9, a signal M coming from the divider 11 every second, and a signal T coming from the counter 13, also every second that the counter is operating. If the microcomputer is in its rest state when the control circuit 14 receives one of those signals, the latter suppresses the signal H and passes the signal J to the circuit 5. If, on the other hand, the microcomputer is in operation, it is the signal C which is passed to the circuit 5 in response to one of the signals P, M or T.

In conventional manner, the memory 1 contains a main program and a series of sub-programs intended to perform the different desired functions. For example, one of the sub-programs is intended for computing the real time, another for setting the watch, another for computing chronographic times, while another makes it possible to ascertain which pushbutton has been pressed and what function of the watch is to be performed, in response to such pressing of a pushbutton and depending on the state of the watch, etc.

When the microcomputer is operating, the content of the program counter 3 determines which is the instruction which is supplied to the output of the program memory 1. After that instruction has been loaded into the instruction register 2, it is performed in response to the signals CO supplied by the control unit 12. The content of the counter 3 then is incremented or modified in dependence on that instruction or the result of performance thereof. Further performance of the program is then conti ued by carrying out the instructions which thus successively occur at the output of the memory 1.

In normal time however, the control unit 12 does not produce any signal as the control circuit 14 passes the signal H thereto. The microcomputer is therefore in the rest state and, in the watch, only the oscillator 10 and the frequency divider 11 are operational.

Figure 7:
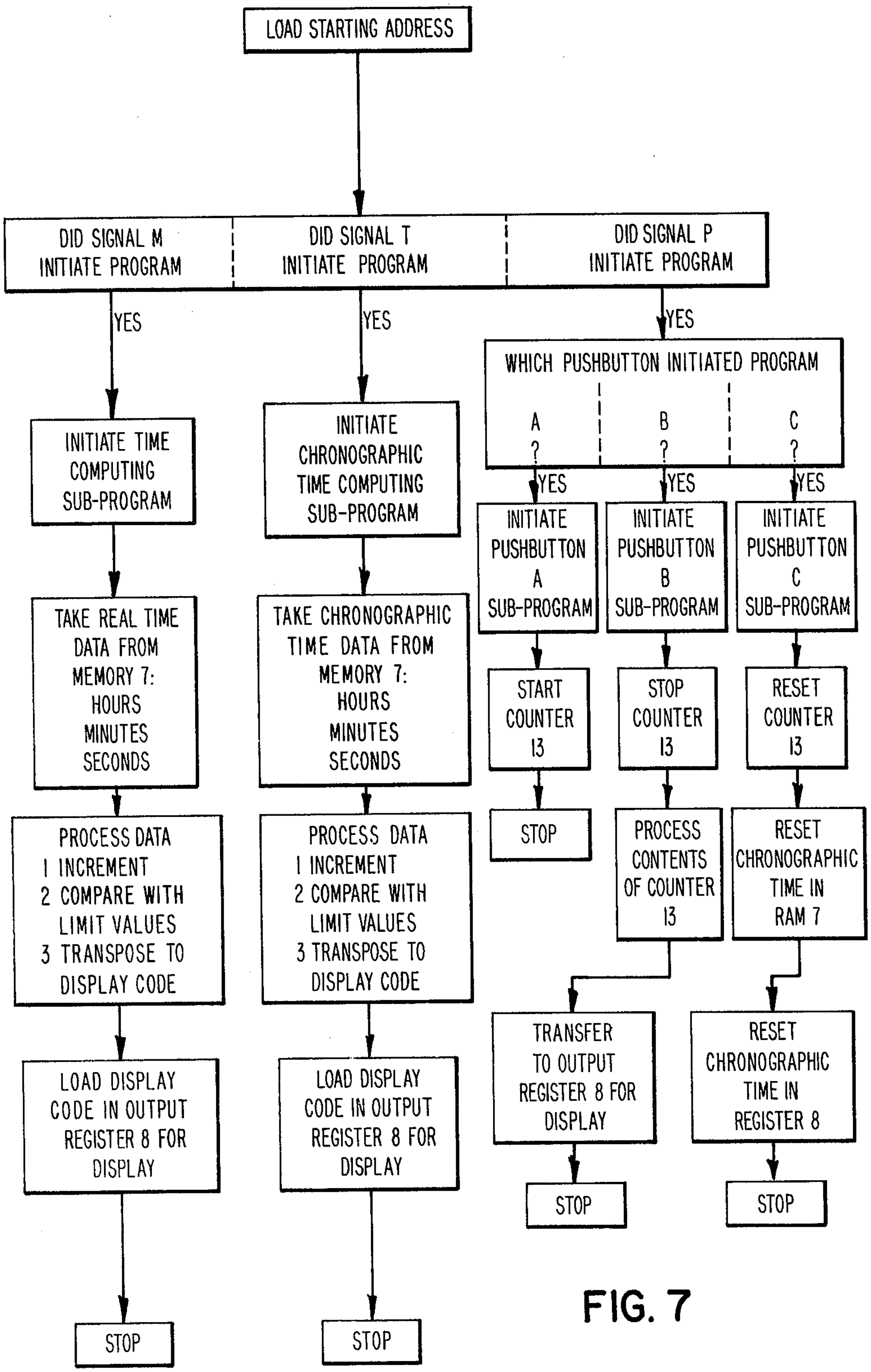
FIG. 7 is a flow diagram of the operation of the watch of FIG. 1.

The microcomputer is set in operation when the control circuit 14 receives one of the signals M, T or P. Each of these signals in fact causes suppression of the signal H and production of the signal J. The circuit 12 therefore begins to supply the signals CO to the circuit determined by the instruction JU that the selector circuit 5 presents to the instruction register 2, in response to the signal J. The instruction JU causes, in particular, the loading into the program counter of the starting address of the main program. FIG. 7 illustrates visually the following discussion of the program.

The program seeks the cause of its being set in operation, and, if appropriate, tests the input circuit 9 in order to define which pushbutton A, B or C has caused the production of the signal P. The corresponding sub-program is then performed.

In normal operation, in the watch mode, only the pulse M, every second, causes the microcomputer to be set in operation as indicated above. As the cause of the microcomputer being set in operation is the signal M, the time computing sub-program is selected. This comprises, in particular, suitable processing by the arithmetic and logic circuit 6 of data which are stored at given positions in the memory 7. The data correspond, in binary form, to the number of seconds, minutes, hours, etc. of real time, and the processing thereof includes, inter alia, incrementations, comparisons with limit values, transpositions of the binary code into a code which is adapted to the requirements of the display, and loading into the output register provided for control, in a conventional manner which need not be described herein, of the display of the time data by the display means 15 of the watch.

The last instruction of the time computing sub-program acts on the control circuit 14 which, in response thereto, passes the signal H to the control unit 12. The circuit 12 therefore ceases to function, and the microcomputer stops.

One second later, the frequency divider 11 again produces the signal M, and the procedure which has been described above begins again.

It should be noted that the performance of this program takes only thirty to forty milliseconds, and that the microcomputer is stopped for the rest of the time. The watch therefore has a very low level of power consumption.

When the microcomputer is set in operation in response to a signal P supplied by the input circuit 9, the program seeks which pushbutton caused the signal P.

If the program finds that the pushbutton pressed was that intended to initiate measurement of a chronographic time, it immediately starts the counter 13 which begins to count the pulses M1 that it receives, at a frequency of 100Hz, from the frequency divider 11. After the counter 13 has been started, the program passes to the control circuit 14 an instruction which causes dispatch of the signal H and therefore causes the microcomputer to be stopped.

One second later, the counter 13 reaches its maximum capacity, is reset to zero and again starts counting. At the same time, it supplies the signal T to the control circuit 14. In response to the signal T, the control circuit 14 sets the microcomputer in operation again.

In that case, the main program initiates a sub-program intended for the computation of the chronographic time. Like the real time computation sub-program, the chronographic time computation sub-program comprises processing, by means of the arithmetic and logic circuit 6, of data relating to chronographic time, which are stored at given positions in the memory 7. It will be appreciated that those positions are different from the positions at which the real time data are stored. The chronographic time data correspond, in binary form, to the number of seconds, minutes and hours of the chronographic time. The processing thereof also includes incrementations, comparisons with limit values, code transpositions, and loading into the output register 8 and thus display thereof by the display means 15.

It should be noted that, during the chronograph operation, only the seconds, minutes and hours of the chronographic time are displayed but not the hundredths of a second.

The last instruction of the chronographic time computation sub-program also causes the production by the circuit 14 of the signal H, which stops the microcomputer.

One second later, the counter 13 again reaches it maximum capacity and is reset to zero. The control circuit 14 therefore again receives the signal T, and the above-described process is begun again.

When the pushbutton for controlling stopping of the chronographic time-measuring process is actuated, the microcomputer is set in operation again, as described above. This time, however, the program immediately causes the counter 13 to stop, and the counter 13 remains in the state which it had reached at that moment. The above-mentioned state of the counter corresponds to the number of hundredths of a second of the chronographic time. A special sub-program is then performed for transfer, after suitable processing, of the content of the counter 13, into the output register 8, at the same time as the data relating to seconds, minutes and hours of the chronographic time. The time is therefore displayed in hundredths of a second.

It will be seen therefore that, by virtue of the provision of the counter 13, computation of the chronographic time is effected at the same rate as computation of real time, that is to say, once per second, and not at the rate of the smallest unit of chronographic time, in this case, a hundredth of a second. In addition, as the counter 13 is connected to the bus means B2 and the content thereof may be processed like the content of one of the positions of the data memory 7, the chronographic time can be displayed in hundredths of a second, although it is calculated, by the microcomputer, only once per second.

Computation of the chronographic time takes from 10 20 milliseconds. The only component which operates permanently during the chronographic measuring operation is the counter 13, the consumption of which is very low. The total consumption of the watch therefore remains at a very low level, even during a chronographic time measuring operation.

The pulses of the signal T and the signal M have the same period of 1 second. Depending on the moment at which the chronograph was started, it therefore can happen that the program set in operation by the other signal is not concluded. In such a case, the new signal is stored by the control circuit 14 and initiation of the corresponding program is delayed until the program which is beingo performed has been concluded. This arrangement does not cause difficulties due to the extreme brevity of the programs.

If, in contrast, a signal P is produced by actuation of a pushbutton while the microcomputer is in the course of performing a program or a sub-program, the control circuit 14 passes the signal C to the circuit 5, and not the signal J. The instruction CA which is then presented by the selector circuit 5 to the instruction register 2 causes the program which is in the course of performance to be stopped, important data to be loaded into the registers such as the register 4, and then the main program to be set in operation, at the beginning thereof. The main program then determines the cause of dispatch of the signal C, and initiates the required sub-program. This first phase is shorter than one hundredth of a second, so that, if necessary, the sub-program which is called up by pressing on the pushbutton is performed sufficiently rapidly to guarantee chronographic time measuring to a hundredth of a second. Then, once this sub-program has been carried out, the data which had been loaded into the storage registers are restored to the circuit which used them, and the microcomputer concludes the program which had been interrupted.

This unique arrangement makes it possible, in particular, to perform all the functions required by measurement of a chronographic time in less than a hundredth of a second, irrespective of the state of the microprocessor at that moment.

It will be appreciated that the microcomputer is also so programmed as to permit resetting to zero of the chronograph in response to pressure on one of the pushbuttons. The sub-program which is provided for that purpose resets to zero the counter 13, the chronographic time data stored in the data memory 7 and the output register 8.

Those skilled in the art will appreciate that other sub-programs may be provided, in order to perform more complex chronograph functions such as split-seconds chronograph measurement of successive partial periods of time, etc.

Finally, the addition of the counter 13 and the control circuit 14 to the integrated circuit which combines all the circuits of the microcomputer does not give rise to any problem. Moreover, the oscillator 10 and the frequency divider 11 are also provided in the same integrated circuit.

Figure 2:
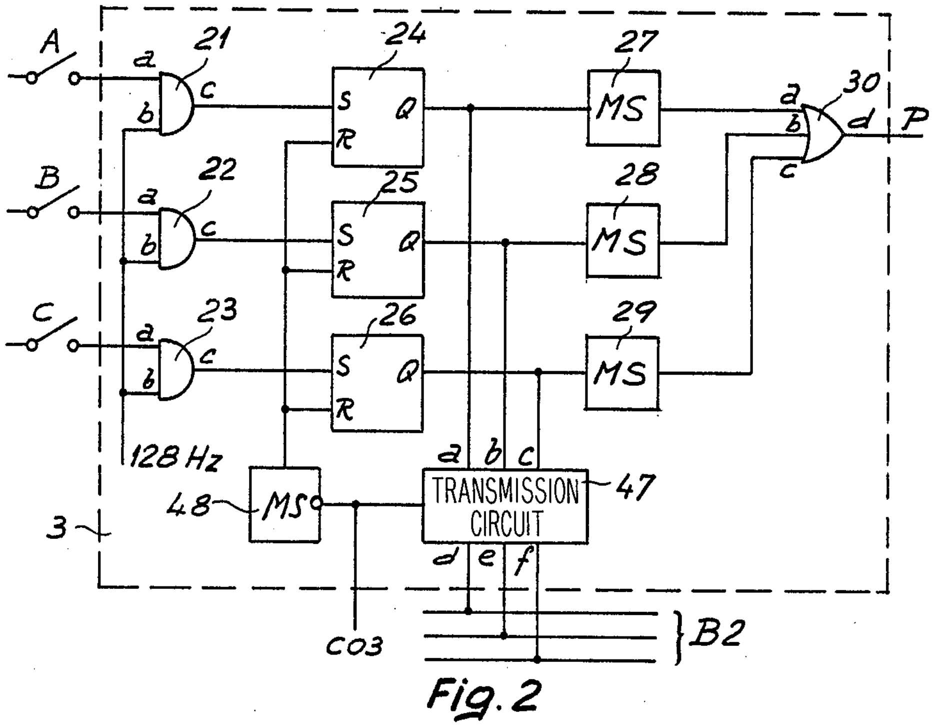
FIGS. 2 and 3 are detailed diagrams of a part of FIG. 1.

FIG. 2 shows, by way of example, a more detailed circuit diagram of the input circuit 9 shown in FIG. 1.

Contacts A, B and C which are actuated by the pushbuttons are connected, by way of surge suppression circuits (not shown), to the first inputs 21*a*, 22*a* and 23*a* of three AND-gates 21, 22 and 23 so as to supply to said inputs a logic signal '0' when they are open and a logic signal '1' when they are closed. The second inputs 21*b*, 22*b* and 23*b* of the gates receive a signal at a frequency, for example, of 128 Hz, from an output of the frequency divider 11 (not shown in FIG. 2). The signal '1' which appears at the output of one of the above-mentioned gates when the corresponding pushbutton is actuated is therefore synchronized with the 128 Hz signal.

The outputs 21*c*, 22*c* and 23*c* of the gates 21, 22 and 23 are connected to the inputs S of three R-S type flip-flops 24, 25 and 26. The outputs O of the flip-flops are connected to three monostable circuits 27, 28 and 29 which, at their output, produce a pulse whenever their input goes from logic state '0' to logic state '1'. The outputs of the monostable circuits 27, 28 and 29 are respectively connected to the inputs 30*a*, 30*b* and 30*c* of an OR-gate 30. The output 30*d* of the gate 30 therefore produces a pulse which is synchronized with the 128 Hz signal, whenever one of the pushbuttons A, B or C is actuated. This pulse is the pulse P referred to in the description relating to FIG. 1.

Figure 4:
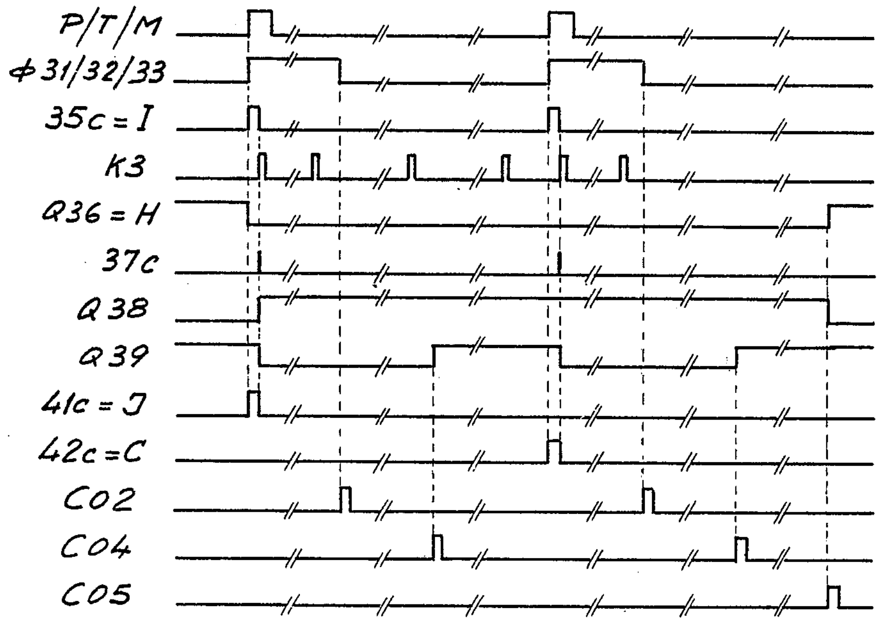
FIG. 4 is a wave form diagram illustrating the mode of operation of the circuit in FIG. 3.
Figure 3:
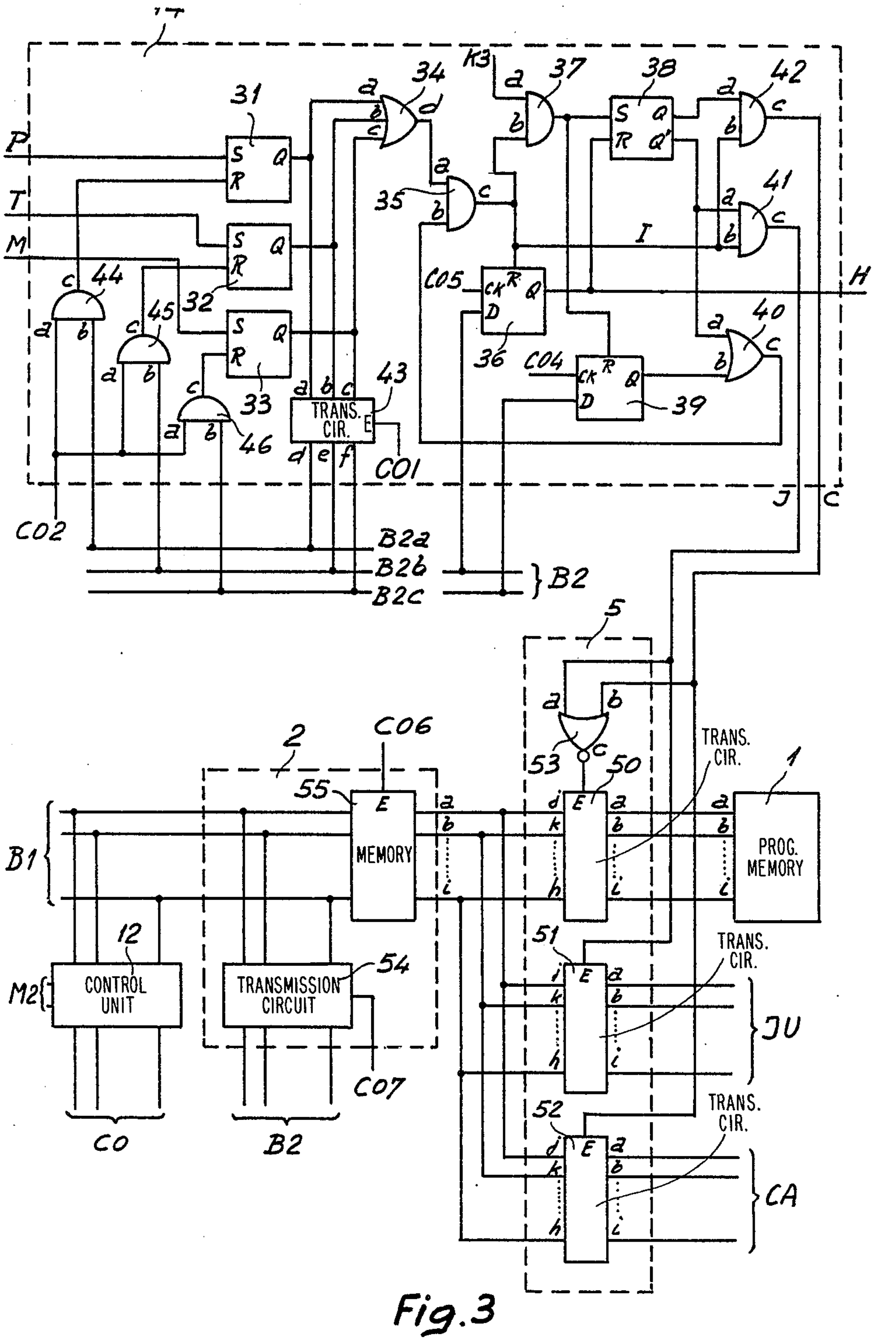

FIG. 3 shows, by way of example, a more detailed circuit diagram of the control circuit 14 of FIG. 1, while FIG. 4 is a sequential diagram illustrating the mode of operation of the control circuit.

The input S of a R-S type flip-flop 31 is connected to the output 30*d* of the gate 30 (FIG. 2). The output Q of the flip-flop 31 and the outputs Q of two other R-S type flip-flops 32 and 33 are respectively connected to the inputs 34*a*, 34*b* and 34*c* of an OR-gate 34. The inputs S of the flip-flops 32 and 33 are respectively connected by suitable connecting means (not shown in FIG. 3) to the output of the counter 13 providing the signal T and the output of the frequency divider supplying the signal M (see FIG. 1).

The appearance of one of the signals P, T or M causes switching of the corresponding flip-flop 31, 32 or 33 and the appearance of a logic signal '1'at the output 34*d* of the gate 34. This signal is transmitted to the output 35*c* of an AND-gate 35 whose input 35*a* is connected to the output 34*d* and whose input 35*b* is at that moment at logic state '1's will be demonstrated hereinafter.

A D-type flip-flop 36 has its input R connected to the output 35*c* of the gate 35. Its output Q which is normally at logic state '1's will be demonstrated hereinafter, therefore goes to logic state '0'in response to the output signal of the gate 35. The signal H, referred to in the description relating to FIG. 1, is formed by the signal present at the output Q of the flip-flop 36. It therefore goes to logic state '0'and the controller unit 12 begins to operate.

After about 0.125 ms, the circuit 12 produces a pulse K3 which is applied by way of a suitable connecting means (not shown) to the input 37*a* of an AND-gate 37. The input 37*b* of the gate 37 is connected to the output 35*c* of the gate 35, which is at logic state '1'. pulse K3 is therefore transmitted to the output 37*c* of the gate 37 and from there, to the input S of a R-S type flip-flop 38 and to the input R of an D-type flip-flop 39.

The input R of the flip-flop 38 is connected to the output Q of the flip-flop 36 which was at logic state '1' and which goes to logic state '0', as demonstrated above. The signal K3 therefore causes switching of the flip-flop 38 whose output Q goes to state '1' and whose output Q' goes to state '0'.

The output Q of the flip-flop 39, which was at logic state '1', as will be demonstrated hereinafter, therefore goes to logic state '0' in response to the same pulse K3.

The two inputs 40*a* and 40*b* of an OR-gate 40 are respectively connected to the outputs Q' of the flip-flop 38 and Q of the flip-flop 39. The output 40*c* of the gate 40 is therefore at logic state '1' before the appearance of the pulse K3. The output 40*c* is connected to the input 35*b* of the gate 35, and it is that state '1' which permits the gate 35 to transmit the output signal '1' of gate 34, to the input 37*b* of the gate 37. The change to logic state '0' of output Q' of the flip-flop 38 and output Q of the flip-flop 39 in response to the pulse K3 causes the outputs 40*c*, 35*c* and 37*c* to switch to state '0'. The output 37*c* therefore supplies only a very short pulse '1', the duration of which depends on the switching time of the flip-flop 38 or 39. In contrast, the output 35*c* produces a pulse I which remains at state '1' for a period of time which is equal to the delay of the pulse K3 with respect to the appearance of the signal '1' at the output 34*d* of the gate 34. As stated above, this delay period is about 0.125 ms. During the pulse I, the output Q of the flip-flop 38 is still at state '0' and its output Q' is still at state '1'. The output 41*c* of an AND-gate 41, whose inputs 41*a* and 41*b* are respectively connected to the output Q' of the flip-flop 38 and to the output 35*c* of the gate 35, therefore produces a pulse of the same duration as the pulse I. The pulse produced by the output 41*c* is the pulse J referred to in the description relating to FIG. 1.

As described with reference to FIG. 1, the signal J causes the data present at the output of the memory 1 to be replaced, at the input of the instruction register 2, by a fixed instruction JU. The instruction JU causes, in particular, the loading into the program counter 3 of the starting address of the main program.

One of the first instructions of that program causes the control unit 12 to produce a signal CO1. The signal CO1 is applied by way of a suitable connecting means (not shown) to the input E of a transmission circuit 43 whose inputs 43*a*, 43*b* and 43*c* are respectively connected to the outputs Q of the flip-flops 31, 32 and 33. The circuit 43 is such that, when its input E is at logic state '0', outputs 43*d*, 43*e* and 43*f* thereof are of very high impedance. In contrast, when the input E of the circuit 43 is at logic state '1', outputs thereof assume the logic state of the corresponding inputs, with a low level of impedance. In response to the signal CO1l, the circuit 43 therefore has, at its outputs, the logic state of the outputs Q of the flip-flops 31, 32 and 33. The outputs 43*d*, 43*e* and 43*f* are each connected to a line B2*a*, B2*b* and B2*c* forming part of the set of connecting means, or bus, B2.

The signal CO1 therefore makes it possible to apply to the bus means B2, information formed by the logic states of the outputs Q of the flip-flops 31 to 33. That information permits the instruction register 2 to ascertain the cause of setting the microprocessor in operation, and therefore to set in operation the sub-program corresponding to that cause.

For example, if it is a signal P which was the cause of the microcomputer being set in operation, the flip-flop 31 has its output Q at state '1' and the line B2*a* of the bus means B2, which is connected to the output 43*d* of the circuit 43, is set to state '1', while the lines B2*b* and B2*c* are at state '0'.

One of the first instructions of the sub-program which is initiated by the above information causes the control unit 12 to produce a signal CO2 which is applied by way of a suitable connecting means (not shown) to the inputs 44*a*, 45*a* and 46*a* of three AND-gates 44, 45 and 46.

The inputs 44*b*, 45*b* and 46*b* of these gates are each connected to one of the lines which form the bus means B2, for example, the above-mentioned lines B2*a*, B2*b* and B2*c*. At the same time as the signal CO2 is supplied by the instruction decoder 12, the latter causes a signal '1' to be applied to line B2*a*, in the present example. The output 44*c* of the gate 44 therefore goes to state '1'. The output 44*c* is connected to the input R of the flip-flop 31 which therefore re-assumes its rest condition in which its output O is at logic state '0'.

One of the following instructions causes the control unit 12 to produce a signal CO3. This signal is applied by way of a suitable connecting means (not shown) to the input E of a transmission circuit 47 which is similar to the circuit 43. During the signal C03, the state of the outputs Q of the flip-flops 24, 25 and 26 is therefore applied to the bus B2, which permits the microcomputer to recognize which pushbutton was actuated, and to select the continuation of the program in consequence. At the end of the signal CO3, a monostable circuit 48 whose input is connected to the input E of the circuit 47, supplies a pulse to the inputs R of the flip-flops 24, 25 and 26.

If triggering of the microcomputer was caused by a pulse T or a pulse M, that cause is detected and the flip-flop 32 or the flip-flop 33 is reset to zero, in a similar manner to that described hereinbefore.

Irrespective of the initial cause of triggering the program, the program includes, at a suitable selected position, an instruction which causes the control unit 12 to produce a signal CO4 which is applied, by way of a suitable connecting means (not shown), to the clock input CK of the flip-flop 39. A moment previously, the input D of the flip-flop 39 is set to logic state "1" by one of the lines of the bus means B2, to which it is connected. The output Q of the flip-flop 39 therefore goes back to state "1". As from that moment, the inout 35*b* of the gate 35 is again at logic state '1'. If a signal P, T or M arrives after that moment, the output 35*c* of the gate 35 can therefore again go to state '1'. The signal K3 can again be transmitted to the output 37*c* of the gate 37 and cause resetting of the output Q of the flip-flop 39, to state '0'.

In contrast, the output Q of the flip-flop 38 is still at state '1'. The pulse I present at the output 35*c* before the appearance of the signal K3 is therefore transmitted to the output 42*c* of an AND-gate 42 of which the input 42*a* is connected to the output Q of the flip-flop 38 and the input 42*b* is connected to said output 35*c*.

The signal which appears at the output 42*c* of the gate 42 is the signal C referred to in the description relating to FIG. 1. As described above with reference to FIG. 1, the signal C causes the program which is in the course of performance to be stopped, and a special sub-program to be initiated. The sub-program also includes instructions causing the production of signals CO1 and CO4 and, if appropriate, CO2 and CO3.

Irrespective of the cause of triggering of the microcomputer, and irrespective of the program that it is performing, the latter comprises, in the last position, an instruction which causes the control unit 12 to produce a signal CO5 which is applied to the clock input CK of the flip-flop 36 by way of a suitable connecting means (not shown). A moment previously, the input D of the flip-flop 36 is set to state '1' by one of the lines of the bus means B2, to which it is connected. The signal H which is supplied by the output Q of the flip-flop 36 therefore goes to state '1', which blocks the control unit 12.

The input R of the flip-flop 38 is connected to the output O of the flip-flop 36. The logic state '1' which appears at that output therefore resets the flip-flop 38 to zero.

Therefore, the microcomputer stops, and all the above-described circuits are in their rest condition.

FIG. 3 also shows the selector 5 which comprises three transmission circuits 50, 51 and 52, which are similar to the circuit 43. The circuits 50, 51 and 52 simply comprise a number of inputs and outputs corresponding to the number of data that they are to transmit.

The inputs 50*a* to 50*i* of the circuit 50 are connected to the outputs 1*a* to 1*i* of the read only memory 1. Each input 51*a* to 51*i* of the circuit 51 is connected to a fixed potential corresponding to logic state '0' or '1'. combination of these logic states at inputs 51*a* to 51*i* corresponds to the combination of states '0' and '1', which forms the instructions JU referred to hereinbefore. Likewise, each input 52*a* to 52*i* of the circuit 52 is connected to one of the potentials corresponding to logic states '0'and '1' so that the combination of these logic states forms the instruction CA which is also referred to above.

The outputs 50*j* to 50*n*, 51*j* to 51*n* and 52*j* to 52*n* of the circuits 50, 51 and 52 are jointly connected to the inputs 2*a* to 2*i* of the instruction register 2.

The input E of the circuit 50 is connected to the output 53*c* of a NOR-gate 53 whose inputs 53*a* and 53*b* are respectively connected to the outputs 41*c* and 42*c* of the gates 41 and 42. The inputs E of the circuits 51 and 52 are also respectively connected to the above-mentioned outputs 41*c* and 42*c*.

In the absence of the signals J and C, it is therefore the information at the outputs 1*a* to 1*i* of the read only memory 1 which is applied to the inputs 2*a* to 2*i* of the instruction register 2.

In contrast, when one of the signals J or C is present, it is the instruction JU or the instruction CA respectively, which is applied to the inputs 2*a* to 2*i* of the instruction register 2, with the above-described consequences on the following processing of the program.

In all cases, the data present at the inputs 2*a* to 2*i* of the instruction register 2 are stored in a memory 55 in response to a signal CO6 supplied by the control unit 12. The stored data are applied to the control unit 12 and to the bus means B1 and thereby to the program counter 3 (see FIG. 1). If appropriate, a part of such data is applied to the bus means B2 by way of a transmission circuit 54, which is similar to the circuits 50, 51 and 52 and which is controlled by a signal CO7 applied at the required moments to its input E by the control unit 12.

Figure 5:
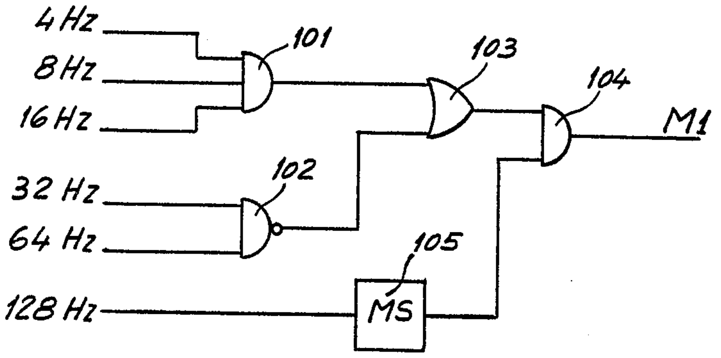
FIG. 5 is a more detailed diagram of another part of FIG. 1.
Figure 6:
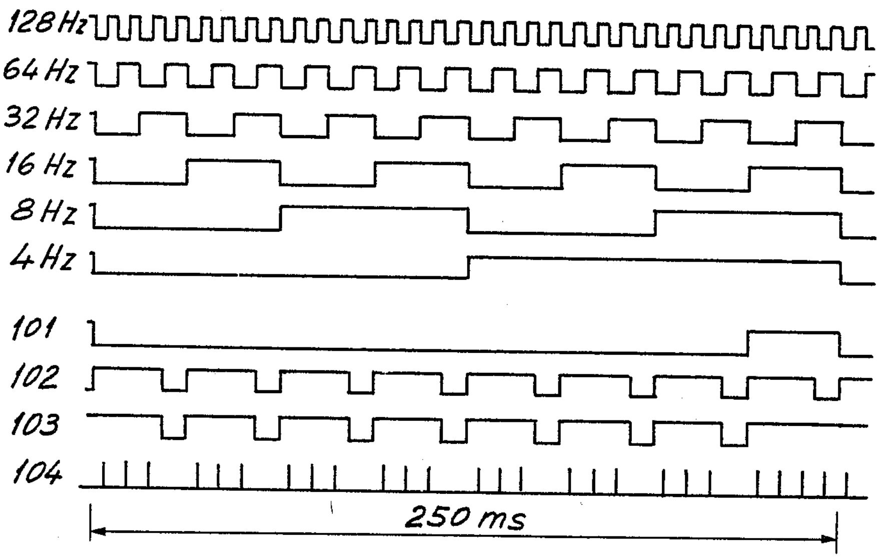
FIG. 6 is a diagram illustrating the mode of operation of the circuit shown in FIG. 5.

An illustrative example of a circuit for producing the pulses M1 at a frequency of 100 Hz is shown in FIGS. 5 and 6. It comprises an AND-gate 101 whose inputs are connected to the outputs of the frequency divider 11 (not shown in FIG. 5), producing signals at frequencies of 4, 8 and 16 Hz respectively. A NAND-gate 102 has its inputs connected to the outputs of the frequency divider 11, producing signals at frequencies of 32 and 64 Hz respectively. The outputs of the gates 101 and 102 are connected to the inputs of an OR-gate 103. The output of the gate 103 is connected to a first input of an AND-gate 104. The second input of the gate 104 receives short pulses supplied by a monostable circuit 105, whose input is connected to the output of the frequency divider 11 which supplies a signal at a frequency of 128 Hz.

It can be seen that, during a period of the signal at a frequency of 4 Hz, that is to say, for a period of 250 ms, the output of the gate 104 supplies 25 pulses M1. In one second, there are therefore 100 pulses M1 supplied. The average frequency of such pulses therefore is 100 Hz but, as the time between two of those pulses is not constant, the instantaneous frequency is no longer constant. The error resulting therefrom, however, is negligible.

If necessary, a more complicated circuit could be provided to make it possible to supply the pulses M1 at a precise frequency of 100 Hz.

While there is shown and described a preferred illustrative embodiment of the invention, it will be understood by those skilled in the art that other modificiations may be made within the principles of the invention and the scope of the appended claims.

I claim:

1. A multifunction watch comprising means for producing a first and a second real time base signal, each comprising periodic pulses of a first frequency and a second frequency higher than said first frequency respectively, manually controllable means for producing a first and a second control signal, display means, and a microcomputer coupled to said real time base signal producing means, to said manually controllable means and to said display means, said microcomputer including a program memory for storing a program, controllable counting means and processing means responsive to said program for computing real time data in response to said periodic pulses of a first frequency, said processing means for supplying said computed real time data to said display means, said processing means responsive to said first control signal for actuating said counting means to start counting from zero said periodic pulses of a second frequency for producing a chronographic time base signal and a binary data signal, said processing means responsive to said second control signal for actuating said counting means to stop counting, said processing means responsive to said chronographic time base signal for computing first chronographic time data and for supplying said computed first chronographic time data to said display means, and said processing means responsive to said second control signal for computing a second chronographic time data according to said binary data signal and for supplying said computed second chronographic time data to said display means.

2. The watch of claim 1, wherein said manually controllable means produces a third control signal, and wherein said counting means includes reset means actuable for resetting said counter to zero and wherein said processing means actuates said reset means for resetting said counter to zero in response to said third control signal.

3. The watch of claim 1, wherein said frequency is 1 Hz and said second frequency is 100 Hz.

* * * * *